United States Patent [19]

Umehara et al.

[11] Patent Number: 5,020,497

[45] Date of Patent: Jun. 4, 1991

[54] METHOD FOR CONTROLLING IGNITION TIMING OF AN ENGINE FOR MARINE VESSELS

[75] Inventors: Kazuhiro Umehara; Tsugio Sugimoto, both of Shizuoka, Japan

[73] Assignee: Suzuki Jidosha Kogyo Kabushiki Kaisha, Shizuoka, Japan

[21] Appl. No.: 469,039

[22] Filed: Jan. 23, 1990

[30] Foreign Application Priority Data

Jan. 31, 1989 [JP] Japan .................................. 1-21668

[51] Int. Cl.$^5$ .......................................... F02P 5/15
[52] U.S. Cl. ..................................... 123/418; 123/602
[58] Field of Search ............... 123/418, 422, 423, 602; 74/872

[56] References Cited

U.S. PATENT DOCUMENTS

| | | | |
|---|---|---|---|
| 3,486,491 | 12/1969 | White | 123/423 X |
| 4,355,550 | 10/1982 | Will et al. | 74/872 |
| 4,403,527 | 9/1983 | Mohl et al. | 74/872 X |
| 4,543,634 | 9/1985 | Kobayashi et al. | 123/423 X |
| 4,630,590 | 12/1986 | Kondo et al. | 123/418 X |
| 4,714,064 | 12/1987 | Imazu | 123/418 X |

Primary Examiner—Tony M. Argenbright
Attorney, Agent, or Firm—Flynn, Thiel, Boutell & Tanis

[57] ABSTRACT

A method for controlling an engine for a marine vessel which includes, when a sudden fluctuation of a load is to be generated due to connecting or disconnecting of a load at a low speed of the engine, the step of advancing the spark ignition timing by a few degrees at the time the connecting or disconnecting is performed. A different feature is a method which includes, when the throttle opening of an engine for a marine vessel is changed from a predetermined opening degree to a substantially closed state, the step of advancing the spark ignition timing by a few degrees.

3 Claims, 8 Drawing Sheets

$I_1 \sim I_5$: TROLLING IGNITION TIMING
$I_6$: START TIME IGNITION TIMING
$I_7$: SPEED REDUCING TIME IGNITION TIMING
$I_8$: MAXIMUM IGNITION TIMING

METHOD FOR CONTROLLING IGNITION TIMING OF AN ENGINE FOR MARINE VESSELS

FIELD OF THE INVENTION

This invention relates to a method for controlling the ignition timing of an engine for a marine vessel and, more particularly, to such a method which can effectively cope with a sudden load fluctuation operation performed when the marine vessel is traveling at a low speed.

BACKGROUND OF THE INVENTION

It has been the usual practice that, in an outboard engine, the ignition timing during trolling is set in the vicinity of 0° to 10° of crankshaft angle after the top dead center or top dead point in view of the necessity for maintaining smooth revolution of the engine at a very low speed. In this case, as the number of revolutions of the engine and the speed of the marine vessel are preferably as low as possible during trolling, the ignition timing is set as late as possible. Because of the foregoing reason, the throttle opening degree is closed as much as possible. Generally speaking, the ignition timing is spark advanced as the engine speed is increased or as the throttle opening degree is increased.

In general, marine vessels have a large traveling resistance. Owing to the foregoing, when a shift is made to the forward position or reverse position after the engine has been started, a large load is suddenly applied to the engine, thus easily resulting in stalling of the engine.

To the contrary, when the throttle is suddenly returned to neutral during traveling for the purpose of coming alongside a pier, the number of revolutions of the engine is rapidly reduced. In this case, the supply of air-fuel mixture generally becomes unstable and this also frequently results in stalling of the engine.

If such stalling of an engine occurred when the marine vessel was about to come alongside the pier or when the marine vessel was about to pass another marine vessel traveling in the opposite direction, danger would be encountered.

In order to prevent this kind of stalling of an engine, it is possible to set the number of revolutions of the engine to a somewhat higher level. In such a case, however, there was an inconvenience in that the required low speed traveling during trolling was disturbed because the minimum speed of the engine became too fast.

One object of the invention is, for the purpose of obviating the above inconvenience inherent in the prior art, to provide a method for controlling the ignition timing of an engine for a marine vessel which is capable of smoothly controlling the revolution of the engine without giving rise to stalling of the engine due to sudden change in a load, particularly during low speed traveling.

SUMMARY OF THE INVENTION

The objects of the present invention are met by providing a method in which, when a sudden fluctuation of a load is to be generated in an engine for a marine vessel through connecting or disconnecting of a load at a low speed of the engine, the ignition timing, which is set to a normal trolling timing, is spark advanced by a few degrees at the time the connecting or disconnecting is performed and the engine is controlled to be ignited in the state where the ignition timing is spark advanced by a few degrees as mentioned.

BRIEF DESCRIPTION OF THE DRAWINGS

A first embodiment of the present invention will be described with reference to FIGS. 1 through 5, in which:

FIGS. 5(1-9) are a timing diagram showing the output waveforms of various components of the embodiment of FIG. 1;

DETAILED DESCRIPTION

Referring to FIGS. 1 to 5, a first embodiment is intended to effectively prevent the stalling of an engine by advancing the ignition spark timing a few degrees with respect to a regular trolling ignition timing when the clutch is operated to shift from a neutral position to a forward position or a reverse position after the engine is started. This embodiment will be described more specifically hereinafter.

First, the overall apparatus for controlling the ignition timing of an engine in this first embodiment will be described.

Figure 1:
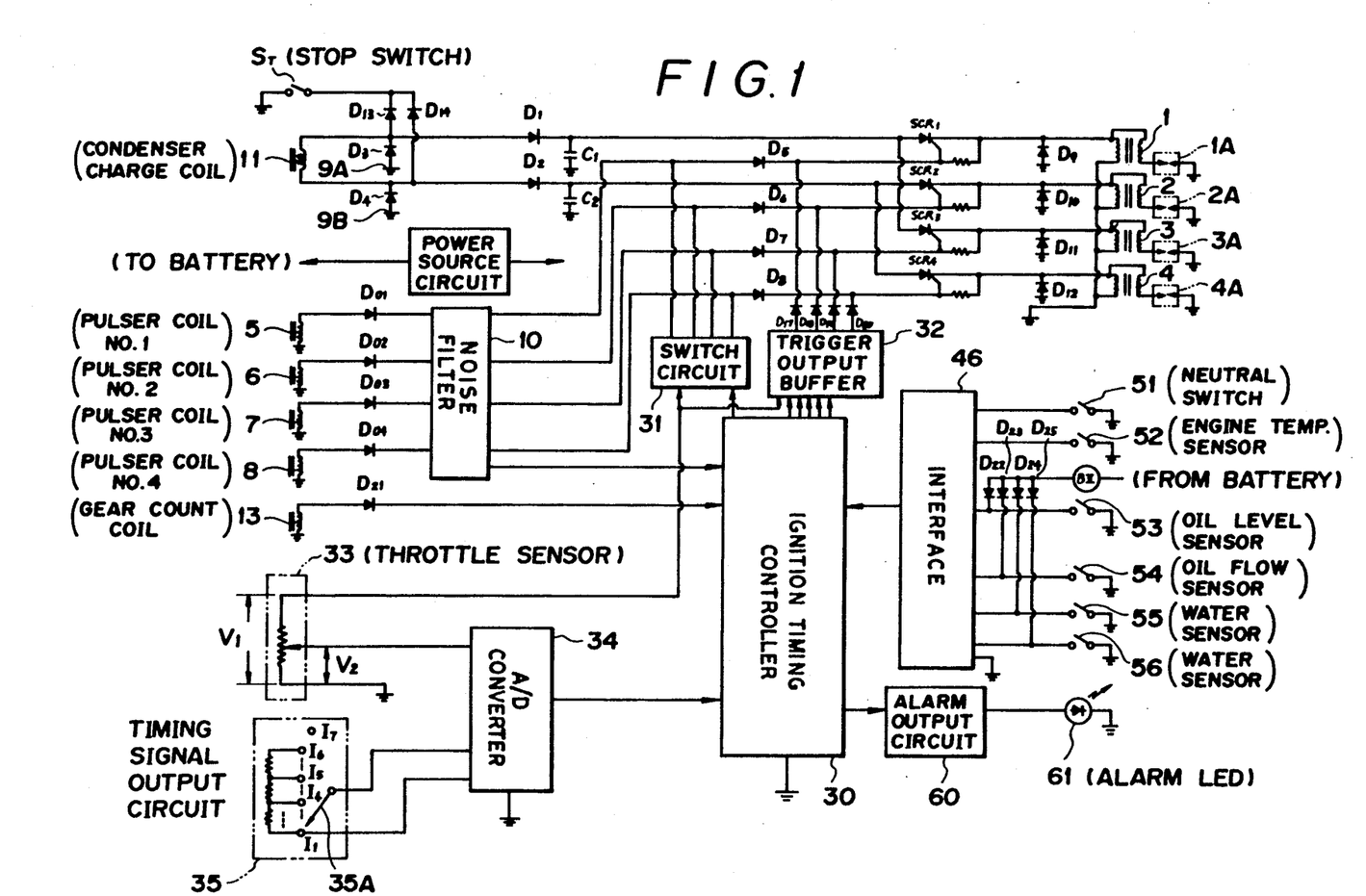
FIG. 1 is a block diagram of a circuit embodying the present invention.

In FIG. 1, reference numerals 1, 2, 3 and 4 denote respective ignition coils. Four pulser coils 5, 6, 7 and 8 are provided in such a manner as to correspond to the ignition coils 1 to 4. Also, the ignition coils 1 to 4 have on their primary sides two charge condensers $C_1$ and $C_2$ for producing separate ignition pulse electric currents, and a condenser charge coil 11 for charging the charge condensers $C_1$ and $C_2$ to a predetermined electric potential.

Figure 2A:
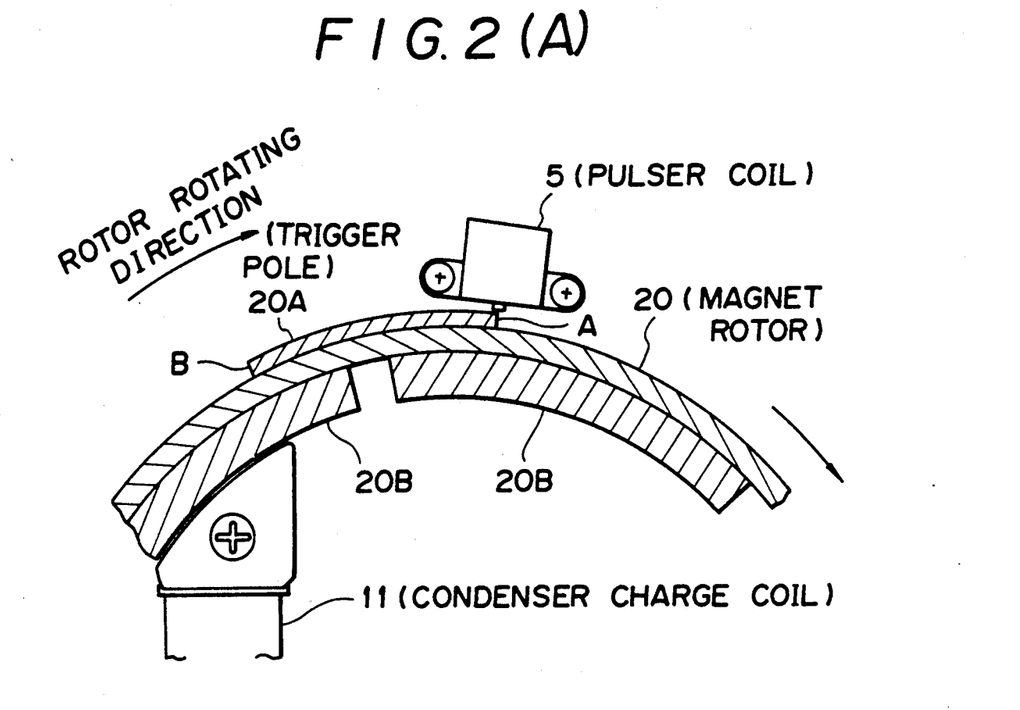
FIGS. 2(A) and 2(B) are fragmentary sectional top views showing the arrangement of respective pulser coils relative to a rotor and a gear count coil relative to a gear.
Figure 2B:
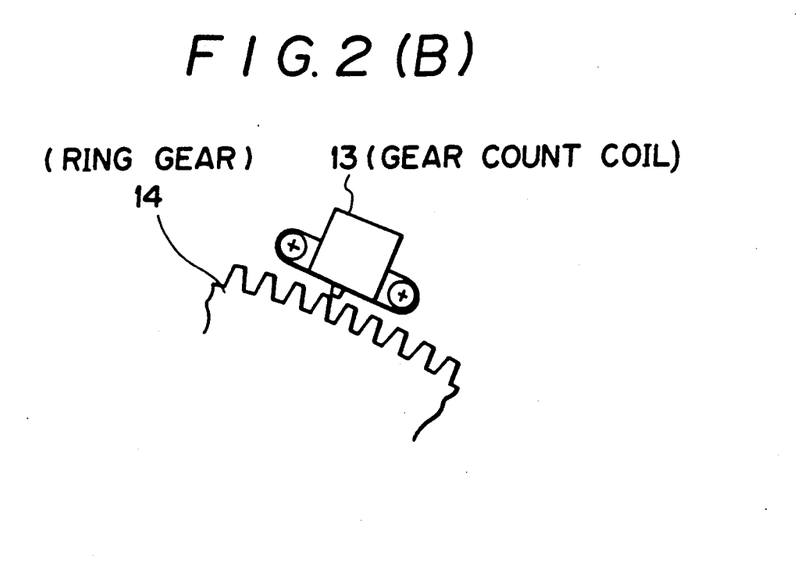

The pulser condensers 5 to 8 are stationarily arranged at predetermined locations adjacent the outer periphery of a magnet rotor 20 in such a manner as to be opposite thereto, as shown in FIG. 2A. The magnet rotor 20 is provided with trigger poles 20A arranged at predetermined locations on its outer periphery. Also, the condenser charge coil 11 is stationarily disposed in such a manner as to be adjacent a plurality of magnets 20B disposed on the inner side of a peripheral wall of the magnet rotor 20. Each of the charge condensers $C_1$ and $C_2$ is respectively charged by one of a plus "+" side output and a minus "−" side output of the charge coil 11. A charge circuit for one charge condenser $C_1$ is a series circuit including diodes $D_1$ and $D_4$ and a ground circuit portion 9B as shown in FIG. 1, and the charge circuit for the other charge condenser $C_2$ is likewise a series circuit including the diodes $D_2$ and $D_3$ and a ground circuit portion 9A. Both end portions of the condenser charge coil 11 can be selectively grounded through respective diodes $D_{13}$ and $D_{14}$ and a common stop switch $S_T$.

The output of each of the pulser coils 5 to 8 is connected to the gate of a corresponding thyristor $SCR_1$ to $SCR_4$ through a respective diode $D_{01}$ to $D_{04}$, a noise filter 10, and a respective diode $D_4$ to $D_8$.

The anode of each of the diodes $D_5$ to $D_8$ is disposed on the side of the noise filter 10 and is connected with an ignition timing controller 30 through a switch circuit portion 31. As this ignition timing controller 30, a microcomputer (hereinafter simply referred to as the microcontroller or "micon" 30) is actually used.

Also, a trigger output buffer 32 is connected between the cathodes of the diodes $D_5$ to $D_8$ and the ignition timing controller 30. The trigger output buffer 32 and the switch circuit portion 31 are designed so that an output signal from a throttle sensor 33 is input into each. Also, the outputs of the trigger output buffer 32 are connected through diodes $D_{17}$ to $D_{20}$ to the cathodes of diodes $D_5$ to $D_8$.

A throttle senser 33 outputs a signal which is determined by a ratio between the voltages $V_1$ and $V_2$. The signal from the throttle senser 33 affects the operation of the switch circuit portion 31 and the trigger output buffer 32 so as to change the ignition timing which depends upon a throttle opening degree.

The noise filter 10 gets rid of the noise of the output signal from the pulser coils, and outputs a signal to the micon 30 which is able to count the output signal.

The output end of each of the thyristors $SCR_1$ to $SCR_4$ is separately grounded through the primary sides of the respective ignition coils 1 to 4. The primary sides of the ignition coils 1 to 4 are separately connected with check diodes $D_9$ to $D_{12}$, which in turn are each connected to ground. Also, among the thyristors $SCR_1$ to $SCR_4$, the anodes of the thyristors $SCR_1$ and $SCR_3$ are deconnected with the output end of the above-mentioned charge condenser $C_1$, while the anodes of the thyristors $SCR_2$ and $SCR_4$ are connected with the output end of the condenser $C_2$. These respective control elements and control circuits implement the ignition timing under control of the ignition timing controller 30, as will be described.

This ignition timing controller 30 is designed so that timing signals $I_1$ to $I_7$ for determining the ignition timing are input thereto through an A/D (analog to digital) converter 34. Reference numeral 35 denotes a timing signal output circuit and 35A a timing switch.

The timing switch 35A is manually controlled. Also, the ignition timing controller 30 is designed so that various sensor signals from a neutral switch 51, an engine temperature sensor 52, an oil level sensor 53, an oil flow sensor 54, a first water sensor 55, and a second water sensor 56 are input thereto through a conventional interface 46. In this embodiment, the neutral switch 51 is adapted to detect when the engine is shifted from a neutral position to one of a forward position or reverse position, and outputs a signal to that effect.

Also, the ignition timing controller 30 is connected with an alarm output circuit 60, so that an alarm light emitting element 61 is controlled to emit light if necessary. Further, a predetermined timing signal is input into this ignition timing controller 30 from a gear count coil 13. This gear count coil 13 is disposed adjacent the outer peripheral surface of a ring gear 14 (FIG. 2B) which is coaxial to and integral with the magnet rotor 20.

The ignition timing controller 30 totally controls each part of the apparatus, as will be described hereinafter, to thereby advance the ignition spark timing by a few degrees with respect to the normal trolling ignition timing when the throttle is returned from its opened position to its totally closed position while a marine vessel containing the engine is moving forward or backward.

Next, the operation of this first embodiment will be described with reference to FIGS. 3 through 4(A) and 4(B).

First, when the magnet rotor 20 is rotated, an electromotive force is generated due to changes in the magnetic flux produced by the magnets 20B mounted on the inner side of this magnet rotor 20 at the core of the condenser charge coil 11 attached opposite this magnet rotor 20B. A "+" side output pulse causes the electric current to flow in the order of "condenser charge coil 11→ diode $D_1$→ condenser $C_1$→ ground→ diode $D_4$" so as to charge the condenser $C_1$. When the rotor is further rotated, a "−" side output pulse is generated this time and an electric current is caused to flow in the order of "condenser charge coil 11→ diode $D_2$→ condenser $C_2$→ ground→ diode $D_3$" so as to charge the condenser $C_2$. In this embodiment, a 4-cylinder engine is involved, wherein the condenser $C_1$ takes care of cylinder Nos. 1 and 3 (not shown), and the condenser $C_2$ takes care of cylinder Nos. 2 and 4 (not shown). An output waveform of the condenser charge coil 11 is shown in FIGS. 5(1) and (2)

Next, an ignition signal will be described.

After the condenser $C_1$ is charged, when the core of the pulser coil 5 (coil built in a magnet) and an end face A of a trigger pole outside the rotor are brought to be opposite each other as shown in FIG. 2(A), an output waveform $P_4$ of the pulser coil 5 is as shown in FIG. 5(3). However, when the ignition timing, which is determined by the opening degree of the throttle and the number of engine revolutions, is less than a start spark advancement ignition timing $I_7$, no influence is exerted on the gate of thyristor $SCR_1$ at all because the micon 30 does not place the switch circuit portion 31 in a conducting state (see FIG. 3).

Accordingly, the magnet rotor 20 is further rotated and when the other end B of the trigger pole 20A and the core of the pulser coil 5 are brought to be opposite each other this time, a waveform $P_3$ of FIG. 5(3) is generated in the pulser coil 5. And as this output is directly applied to the gate of the thyristor $SCR_1$, thyristor $SCR_1$ is turned on to abruptly discharge an electric charge already charged in the condenser $C_1$ in the order of "condenser $C_1$→ thyristor $SCR_1$→ primary coil of ignition coil 1". As a result, a high voltage is generated in the secondary coil of the ignition coil 1 and a spark is effected via a spark plug 1A. This becomes the start spark advancement ignition timing $I_7$. This aims at improving the starting efficiency. Spark plugs 2A, 3A and 4A are ignited one after another in the same manner.

Figure 3:
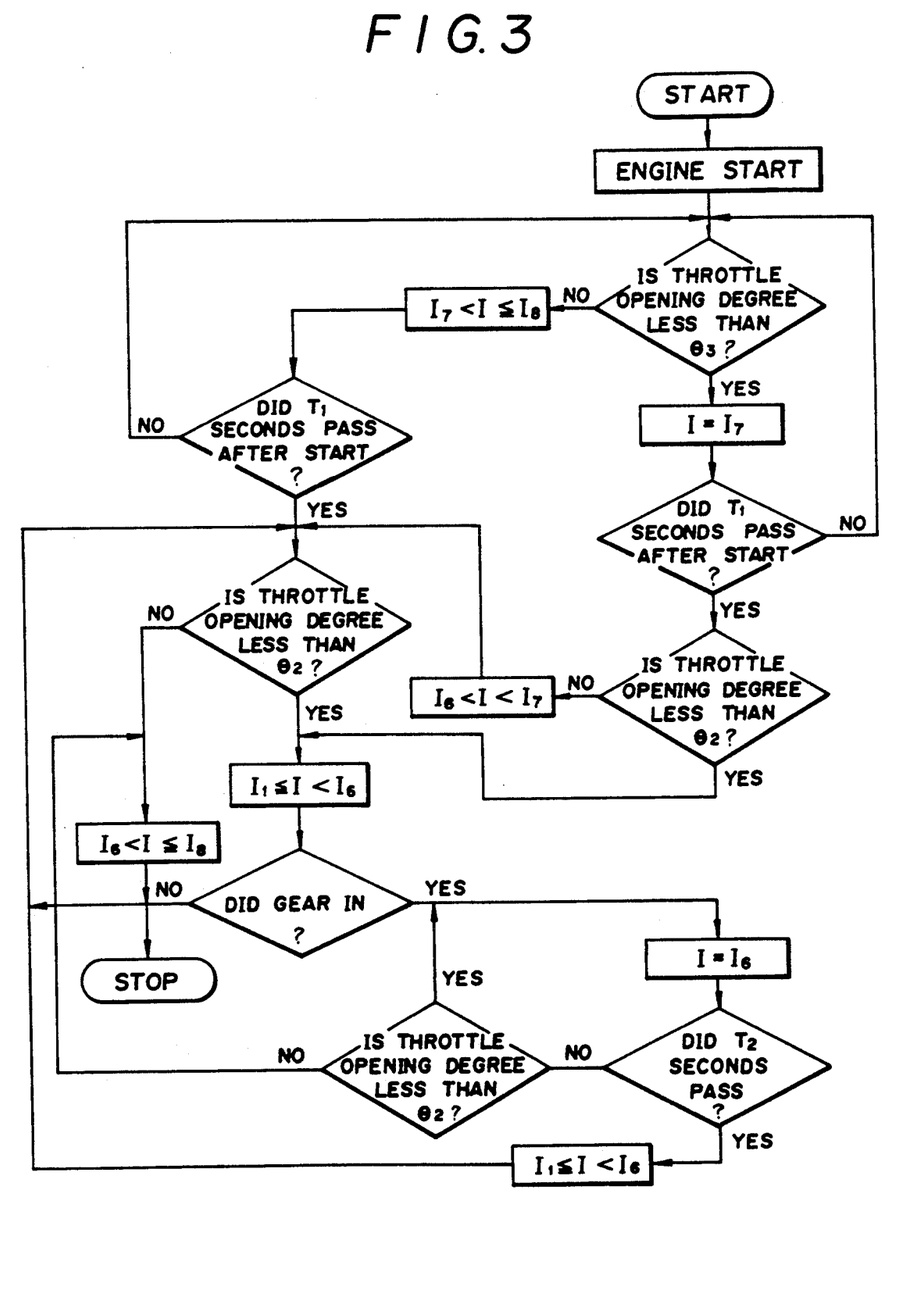
FIG. 3 is a flowchart showing the operation of an ignition timing controller which is a component of the embodiment of FIG. 1.

And, as is shown in FIG. 3, after the start spark advancement setting time $T_1$ seconds has passed, a conducting signal for the switch circuit 31 is output by the micon 30. As a result, the switch circuit 31 is placed in a conducting state. Owing to the foregoing, the pulser coil output $P_8$ shown in FIG. 5(3) is bypassed at the switch circuit 31. Accordingly, no influence of $P_8$ is exerted on the gates of the thyristors $SCR_1$ to $SCR_4$ at all, and the thyristors $SCR_1$ to $SCR_4$ are turned on and discharged entirely in accord with signals from the micon 30.

Figure 4A:
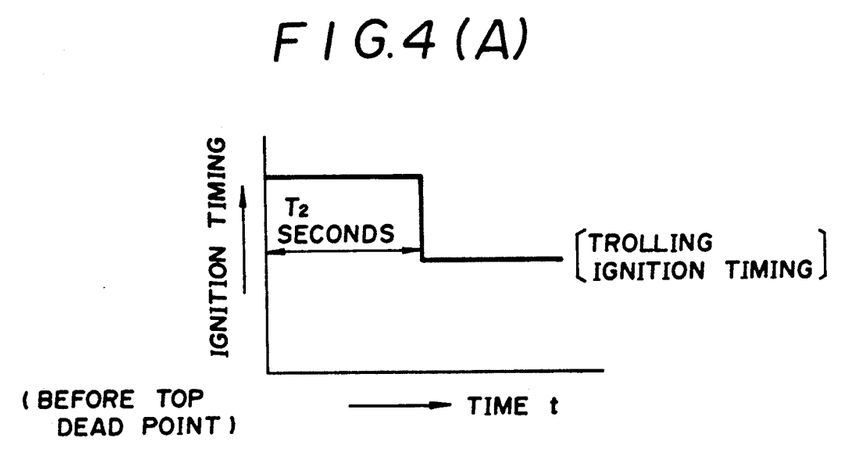
FIGS. 4(A) and 4(B) are showing ignition timing versus time and throttle opening, respectively.
Figure 4B:
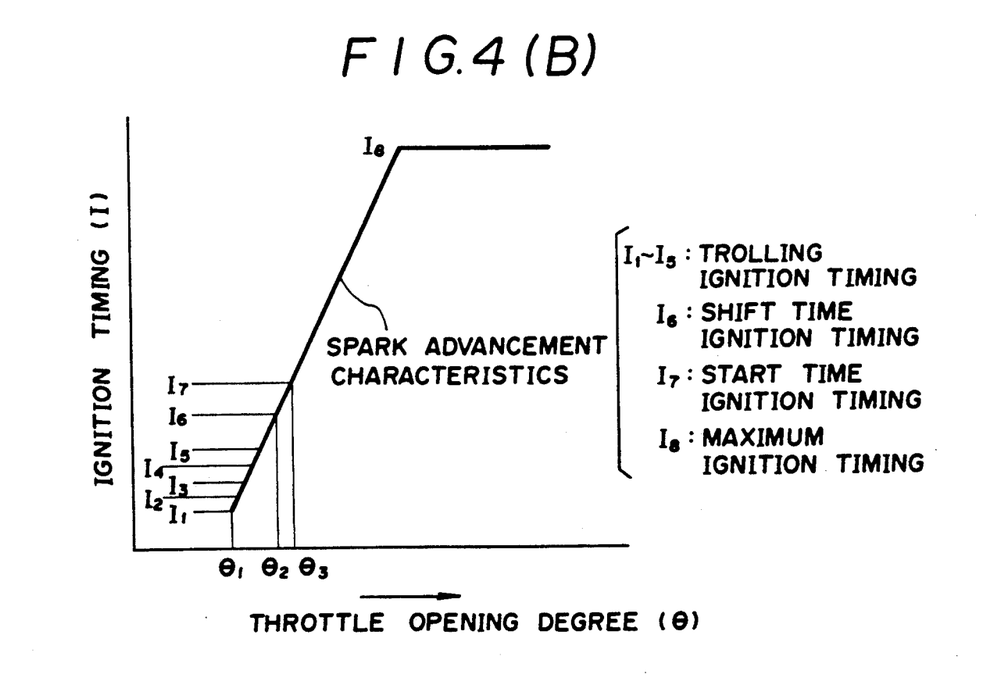
Figure 5:
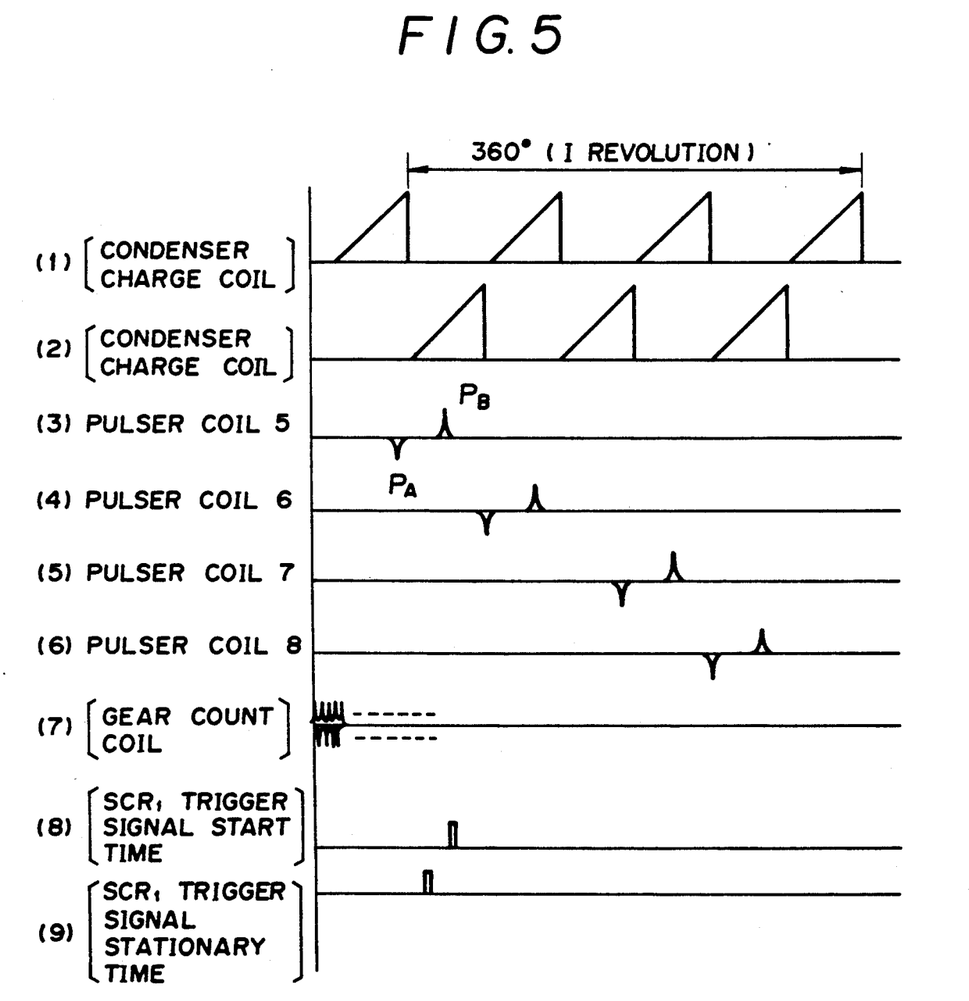

This is performed in accordance with the following operation. When the output $P_4$ of the pulse coils 5 to 8 is input into the micon 30 through the noise filter 10, the micon 30 counts the output of the gear count coil 13 with reference to the signal. And as the micon 30 produces outputs to the gates of the thyristors $SCR_1$ to $SCR_4$ through the trigger output buffer 32 at the ignition timing which is determined by an output ratio of outputs $V_1$ and $V_2$ of the throttle sensor 33 (representing the throttle opening degree at that time) and by the number of revolutions of the engine, the respective thyristors are turned on one after another and a spark is effected to each of the spark plugs 1A to 4A. This operation is performed for the thyristors $SCR_1$ to $SCR_4$ in sequence. This is the normal ignition timing range when the throttle opening degree is more than $\theta_1$ of FIG. 4(B). In order to facilitate an easy understanding, FIG. 4(B) shows a relation between the throttle opening degree and the ignition timing, but a relation with the number of revolutions of the engine is omitted.

Next, there will be described a trolling ignition timing when the throttle opening degree is less than $\theta_1$. This ignition timing involves the same basic procedure as the normal ignition timing. The different points are as follows. The timing switch 35A (FIG. 1) is set to select a respective resistance value, a voltage due to this resistance value is converted to a digital signal by the A/D converter 34, the result is input into the micon 30, the micon 30 produces outputs to the gates of the thyristors $SCR_1$ to $SCR_4$ through the trigger output buffer 32 at the ignition timing $I_1$ to $I_5$ (FIG. 4B) corresponding to the selected resister value, a high voltage is generated in the ignition coils 1 to 4 and sparks are effected at the spark plugs 1A to 4A.

Next, there will be described the operation at the time when shifting is performed from a neutral position.

Since an engine with a starter motor is provided with a neutral interlock mechanism in which the starter motor is, in general, not activated unless the transmission is in a neutral position, the engine is necessarily started with the transmission in the neutral position. In this case, the engine is started at the start spark advancement ignition timing $I_7$.

After passage of a start spark advancement setting time $T_1$ seconds, it goes to one of the ignition timings $I_1$ to $I_5$ determined by the timing switch 35A. For example, given that the timing has been determined to be $I_1$ when the throttle opening degree is less than $\theta_1$, if shifting is performed to F (forward) or R (reverse), the neutral switch 51 is turned from ON to OFF, a signal is fed from the interface 46 to the micon 30 and triggers are output from the micon 30 to the gates of the thyristor at the ignition timing $I_6$ through the trigger output buffer 32. Accordingly, the moment the shifting is effected, the ignition timing is spark advanced from $I_1$ to $I_8$ and maintained there for $T_2$ seconds.

And when $T_2$ seconds have passed, the trigger output from the micon 30 is switched back to the ignition timing $I_1$. See FIG. 4(A). On the other hand, when the shifting operation is effected within the start spark advancement setting time after the start, the start spark advancement state $I_7$ is maintained irrespective of the shifting position.

Even if a load is abruptly increased when the shifting is made from the neutral position to the forward or reverse position through the afore-mentioned procedure, it can be made possible that the ignition timing is spark advanced to increase the engine output, to thus avoid stalling of the engine.

When shifting, although the ignition timing $I_6$ for spark advancement during shifting has been set within $I_1$ to $I_7$, it may be set to the start spark advancement $I_7$ or to the earliest ignition timing for trolling $I_5$.

Regarding the start spark advancement time $T_1$, although it has been described above as being a certain period of time, the system is arranged (as shown in FIG. 1) so that the interface 46 is connected with the engine temperature sensor 52, and this engine temperature sensor 52 could be disposed at a suitable place on the engine so that the switch is turned off when the cylinder temperature is lower than a predetermined level and turned on when the temperature is higher than a predetermined level, the setting time for being in the off-position being longer than the setting time for being in the on-position. Start spark advancement would be effected while the switch is off, although the on-off operations may be reversed. This arrangement is intended to make the start spark advancement time long when the engine is cooled and short when the engine is warmed. Furthermore, instead of setting by time, the system may be designed in a manner so as to go to the start spark advancement when the temperature is lower than a predetermined level, or to be start spark advanced for a very short period of time when the temperature is higher than a predetermined level and returned to the trolling ignition timing immediately.

Figure 6:
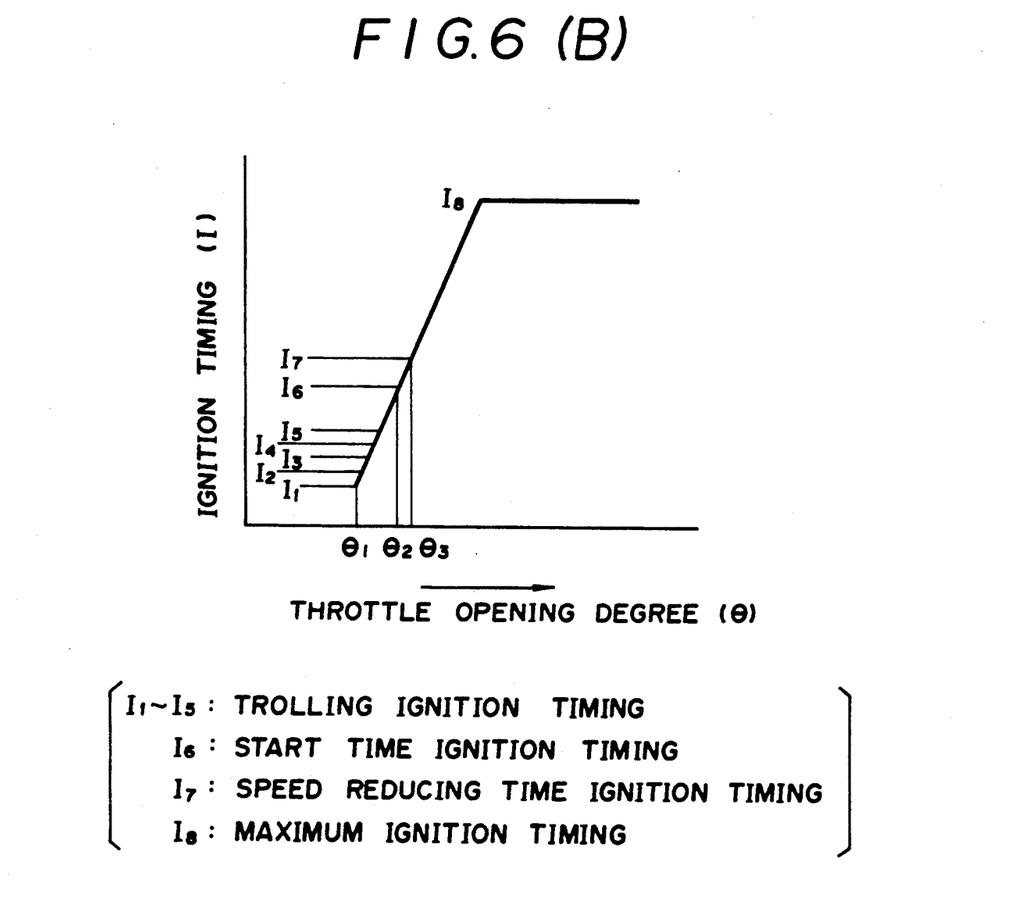
FIG. 6(A) is a flowchart for an alternative embodiment of the circuit of FIG. 1.
FIG. 6(B) is a graph similar to FIG. 4(B) but showing ignition timing versus throttle opening for the alternative embodiment.
Figure 6A:
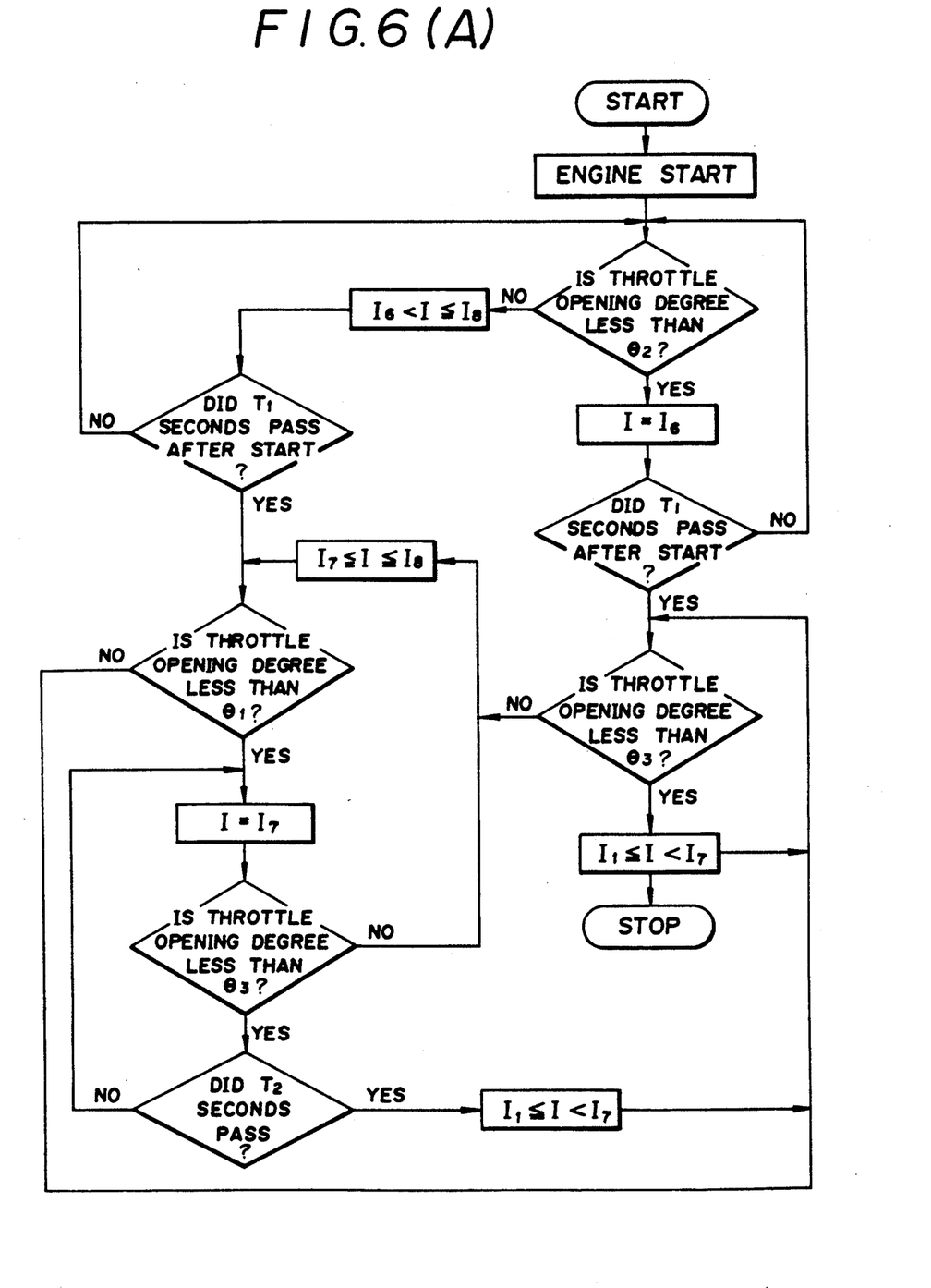
Figure 7:
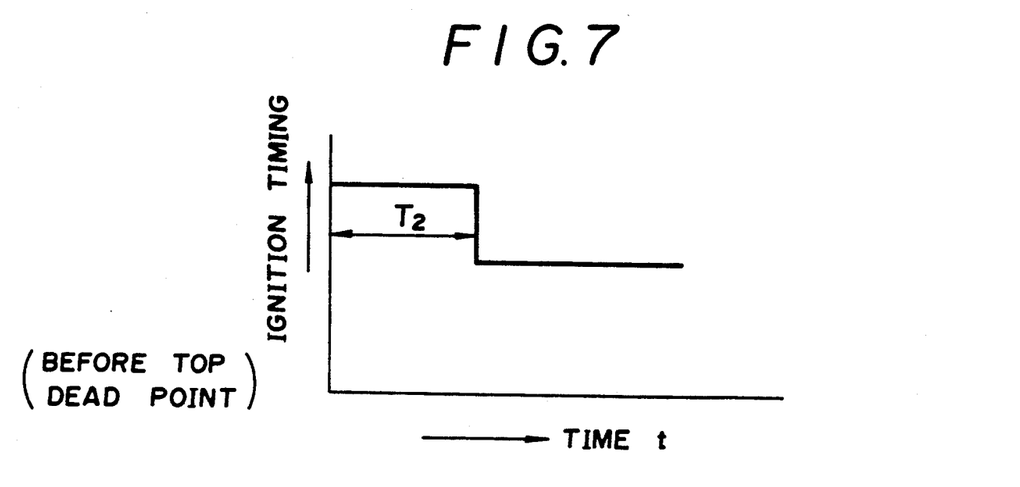
FIG. 7 is a graph similar to FIG. 4 but showing ignition timing versus time for the alternative embodiment.
Figure 8:
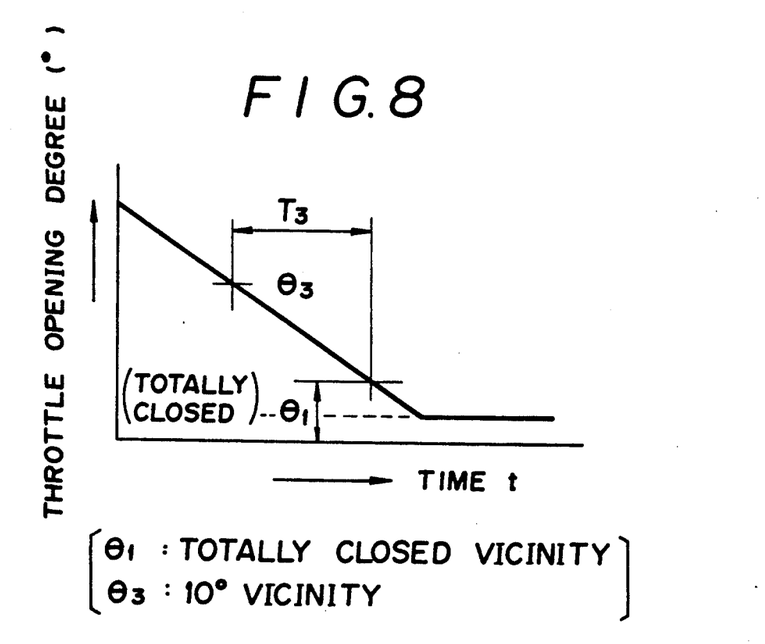
FIG. 8 is a graph showing throttle opening versus time for the alternative embodiment.

Next, the second embodiment will be described with reference to FIGS. 6 through 8.

The second embodiment is designed so that, even when a throttle opening of a certain degree is suddenly returned to a totally closed state during traveling of a marine vessel, the engine can be continuously operated comparatively easily without giving rise to stalling of the engine. In this second embodiment, the construction of the various parts is the same as that of the first embodiment, except for operation of the ignition timing controller 30.

The following description relates mostly to the function of the ignition timing controller 30 in this second embodiment. First, since an engine with a starter motor is normally provided with a neutral interlock mechanism in which the starter motor cannot be activated unless the transmission is in a neutral position, the engine is started in the neutral position. In this case, the engine is started at the start spark advancement ignition timing $I_6$ of FIG. 6. In this case, when a first idle lever is opened, since only the throttle opening degree is opened even in the neutral position in this embodiment, it may be designed so that it is spark advanced in accord with the opening degree of the throttle and the ignition timing may be made to be the ignition timing $I_6$ to $I_8$ of FIG. 6, which is spark advanced further than the start spark advancement $I_6$ when it became $\theta_2$ in opening degree.

When the start spark advancement time of $T_1$ seconds has passed, the throttle opening degree is, in general, less than $\theta_1$ and the timing becomes one of the trolling ignition timings $I_1$ to $I_5$ determined by the resistance value of the timing switch 35A. In this second embodiment, when the actual throttle opening degree is returned from a level more than a certain throttle opening degree to a totally closed state, the throttle opening value used for determining spark advancement is set to $\theta_3$ (ignition timing $I_7$).

When the throttle opening degree is reduced to $\theta_1$ in order to reduce the speed from a state where the start spark advancement is finished, the vehicle has entered a general traveling state, and the throttle opening degree is more than $\theta_3$, the micon 30 detects the ratio between the output voltages $V_1$ and $V_2$ of the throttle sensor 33, and outputs signals to the trigger output buffer 32 at the ignition timing $I_7$ to control the gates of the thyristors $SCR_1$ to $SCR_4$. As a result, the thyristors $SCR_1$ to $SCR_4$ are turned on and finally a spark advancement is effected to the spark plugs 1A to 4A at the ignition timing $I_7$. After this timing has continued for $T_2$ seconds, it returns to the original ignition timing (normally a trolling ignition timing of $I_1$ to $I_5$).

As the throttle opening degree is returned from more than a certain opening degree to a totally closed state through the foregoing procedure, the stalling of the engine due to output down can be prevented.

Although there has been described a method for controlling the ignition timing by detecting the change of throttle opening degree, it may be designed such that the number of revolutions of the engine is additionally adopted as a factor and the spark advancement takes place when it is satisfied that the throttle opening degree is changed from more than the preset opening degree to the totally closed state when the engine speed becomes lower than a preset number of revolutions. Furthermore, if an additional condition is that the time when return of the throttle is performed is within $T_3$ seconds of the preset time, a more highly accurate operation can be obtained (see FIG. 8). The controller 30 forces the ignition timing to the advance of $I_7$ for the time period $T_2$ only if the throttle opening drops all the way from $\theta_3$ to $\theta_1$ in a time interval less than or equal to $T_3$.

Although the above description refers to passage of a certain time for the start spark advancement, it may be designed, as shown in FIG. 1, so that the interface 46 is connected with the engine temperature sensor 52, the engine temperature sensor 52 is disposed in a suitable place on the engine so that it would be turned off when the cylinder temperature becomes lower than a certain level and turned on when the temperature becomes higher than a certain level, and the setting time for being in the off-position is made longer than the setting time for being in the on-position. This is intended to make the start spark advancement time long when the engine is cooled and short when the engine is warmed. Furthermore, instead of setting by time, even if it is designed so that the start spark advancement takes place when the temperature is lower than the preset level and the start spark advancement takes place for a very short period of time (2 to 3 seconds) and is almost immediately returned to the trolling ignition timing when the temperature is above the preset level, generally the same things can be set with ease.

As described in the foregoing, according to the present invention, there is adopted a constitution so that, when a sudden fluctuation of a load is to be generated in an engine for marine vessels through a connecting operation or disconnecting operation of the load at a low speed of the engine, the ignition timing, which is set to a normal trolling time, is spark advanced by a few degrees at the same time the respective operation is performed and the engine for marine vessels is controlled to be ignited in the state where the ignition timing is spark advanced by a few degrees as mentioned. Accordingly, there can be provided an excellent method for controlling ignition timing of an engine for marine vessels which is capable of effectively controlling the revolution of the engine without giving rise to stalling of the engine even with respect to sudden fluctuation of loads during the operation for bringing a marine vessel alongside a pier when the marine vessel is traveling at a low speed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for controlling the ignition timing of an engine for use in a marine vessel comprising the step, when a sudden fluctuation of a load is to be generated in the engine through a connecting operation of the load at a low speed revolution of the engine, of spark advancing the ignition timing from a normal trolling time by a few degrees as said connecting operation is performed, and the step of terminating said spark advancing step a predetermined time interval after commencement thereof.

2. A method for controlling the ignition timing of an engine for use in a marine vessel comprising the step, when a sudden fluctuation of a load is to be generated in the engine through engagement of gear which facilitates connection of the load to the engine at a low speed revolution of the engine, of spark advancing the ignition timing from a normal trolling time by a few degrees in direct response to physical engagement of said gear.

3. A method according to claim 2, including the step of terminating said spark advancing step a predetermined time interval after commencement thereof.

* * * * *